United States Patent [19]

Beck et al.

[11] 4,202,949
[45] May 13, 1980

[54] BRANCHED SEGMENT POLYMERS

[75] Inventors: Manfred Beck, Odenthal; Jochen Schnetger, Odenthal-Hoeffe; Volker Serini, Krefeld; Gottfried Pampus, Leverkusen, all of Fed. Rep. of Germany

[73] Assignee: Bayer Aktiengesellschaft, Leverkusen, Fed. Rep. of Germany

[21] Appl. No.: 886,814

[22] Filed: Mar. 15, 1978

[30] Foreign Application Priority Data

Mar. 19, 1977 [DE] Fed. Rep. of Germany ....... 2712230

[51] Int. Cl.$^2$ ...................... C08L 25/10; C08L 69/00
[52] U.S. Cl. ......................................... 525/92; 525/98
[58] Field of Search ................. 260/873, 880 B, 876 B

[56] References Cited

U.S. PATENT DOCUMENTS

| | | | |
|---|---|---|---|
| 3,281,383 | 10/1966 | Zelinski et al. | 260/880 B |
| 3,991,009 | 11/1976 | Margotte et al. | 260/873 |
| 4,088,711 | 5/1978 | Gergen et al. | 260/873 |
| 4,090,996 | 5/1978 | Gergen et al. | 260/873 |
| 4,146,587 | 3/1979 | Beck et al. | 260/873 |

Primary Examiner—Wilbert J. Briggs, Sr.
Attorney, Agent, or Firm—Connolly and Hutz

[57] ABSTRACT

Branched polymers being producible by reacting an anion of a branched aromatic vinyl/diene block polymer with an aromatic polycarbonate or with a mixture of aromatic polycarbonates wherein at least 50% of the linear chains of the polycarbonate or mixture of polycarbonates consist of structural units corresponding to the Formula (1)

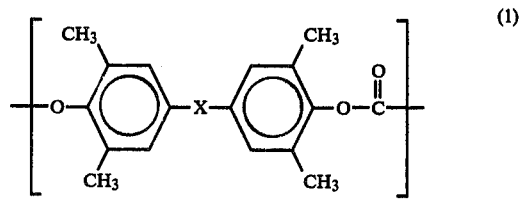

in which X represents a $C_1$–$C_5$-alkylene or $C_1$–$C_5$-alkylidene radical.

7 Claims, No Drawings

BRANCHED SEGMENT POLYMERS

Segment polymers, for example of the ABA-type (A=aromatic polyvinyl compound, B=diene polymer block), have thermoelastic properties, that is to say they soften at temperatures upwards of 60° C. and can be processed like a thermoplast at temperatures around 180° C. When cooled to room temperature, these products show rubber-like elasticity. One disadvantage of these products is that, due to the aromatic polyvinyl blocks, the softening process and, hence, the deterioration of the mechanical properties begins undesirably and quite clearly at temperatures as low as 50° C. Attempts to use α-methyl styrene instead of styrene have hitherto failed to produce improved products.

ABA-Block polymers are normally produced by coupling A/B block anions with suitable compounds. Examples of these compounds are esters, epoxides, ketones, halogen compounds, isocyanates, nitriles and aldehydes.

There is a need for segment polymers which have the properties of rubber and which still show adequate strengths at elevated temperatures. This is important not only in regard to use at elevated temperatures, but also in regard to the handling of the products during their production. For example, the higher the thermal stability of the products, the higher the mould-release temperature after extrusion can be, in other words higher machine throughputs are possible.

It has now been found that thermoplastic elastomers having improved thermal stability can be produced by reacting anions of branched aromatic vinyl/diene block polymers with aromatic polycarbonates of which at least 50% of the linear chains consist of structural units corresponding to the formula (I)

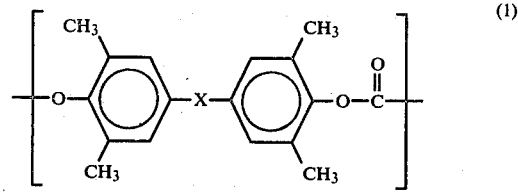

in which
X—represents a $C_1$–$C_5$-alkylene or alkylidene radical.

Branched or slightly branched aromatic polyvinyl-/polydiene anions are suitable for reaction with the polycarbonates. Anions with a star-like branching configuration may also be used for this reaction.

The branched polymer anions are produced by the usual methods of anionic polymerisation using alkali or alkaline earth metals or alkali alkyls in inert solvents (cf. L. J. Fetters and R. J. Ceresa, Block and Graft Copolymerisation, page 99).

In cases where polyfunctional alkali compounds, for example $R(Li)_n$ (n>2), are used, the above-mentioned branched polyanions may be obtained. Living A-B-block polymers branched with divinyl benzene can be produced from living A-B-diblock anions by a method similar to that described by Rempp et al (Pure Appl. Chem. 30 (1972) 229) for the production of polystyrene polymers having a star-shaped branching configuration. These living A-B-block polymers may also be reacted with the polycarbonates. A modification of Rempp's method is the reaction described by H. Eschwey et al (Makromol. Chem. 173, 235 (1973)) of lithium butyl with divinylbenzene to form soluble microgel which contains a large number of anionic terminal groups. The reaction of this soluble microgel with butadiene and styrene in any order also gives highly branched living S/B-anions which can react with polycarbonates.

Branched styrene butadiene polyanions which can be reacted with polycarbonates are also obtained by reacting a linear polystyrene anion with a mixture of butadiene and divinyl benzene (DOS No. 2,535,801).

A similar reaction is possible between the multi-star block polymer anions obtainable in accordance with German Offenlegungsschrift No. 2,521,200 and polycarbonates. In this case, too, novel products with improved service properties are obtained.

Further examples of branched S/B-polymer anions are described in German Offenlegungsschrift No. 2,529,065. In this case, styrene/dienyl anions are initially produced and subsequently branched with divinyl benzene. The resulting polyanions may, of course, also be reacted with polycarbonates. The process according to the invention is by no means confined to the above-mentioned processes for the production of branched S/B-polymer anions and their reaction with polycarbonates. It may be applied in analogous manner to any branched polymer anion.

For example, it is possible to produce branched block polymers with side branches from so-called transition block polymers. They are formed when B and A are simultaneously polymerised in the presence of a multi-functional initiator. A B-block is initially formed which, towards the end of the B-polymerisation, increasingly contains A-molecules incorporated therein until, finally, after all the B-monomers have been used only A-monomers are polymerised to form the pure A-block. Numerous variants of this method have been described. The living anions can also be reacted with polycarbonates.

It is also known that the polymerisation of butadiene with lithium butyl in apolar solvents leads predominantly to 1,4-linkages. If it is desired to obtain products with a large proportion of 1,2-linkages of the butadiene block, this is also possible by the addition of polar inert compounds, such as ethers, tertiary amines, and the like in known manner.

Suitable solvents for producing the living anions are the known inert hydrocarbons, such as pentane, hexane, cyclohexane, benzene and toluene. It is also possible to use mixtures, even with low-boiling or relatively high boiling inert hydrocarbons.

The following are mentioned as examples of suitable aromatic vinyl compounds of the A-type: styrene, α-methyl styrene, alkyl styrenes and vinyl naphthalene. The following are mentioned as examples of suitable dienes of the B-type: butadiene, isoprene, piperylene. In the living anions before the reaction with the polycarbonates, the aromatic vinyl blocks A have molecular weights of from 5,000 to 500,000 whilst the diene blocks B have molecular weights of from 10,000 to 1,000,000. Preferred anions are anions having a molecular weight of block A in the range from 10,000 to 50,000 and of block B in the range from 20,000 to 80,000.

The polycarbonates used are aromatic polycarbonates of which at least 50% of the linear chains consist of structural units of formula (1) in which X represents a $C_1$–$C_5$-alkylene or alkylidene radical. Polycarbonates which may be used in accordance with the invention are obtained in known manner from bisphenols corresponding to the formula (2)

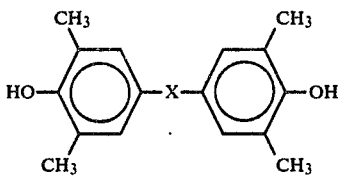

in which X represents a $C_1$-$C_5$-alkylene or alkylidene radical.

Bisphenols which do not correspond to Formula (2) can be used, provided that the polycarbonates obtained contain, at least 50%, units of Formula (1).

Instead of using copolycarbonates such as these, it is also possible to use mixtures of different polycarbonates including polycarbonates only of bisphenols which do not correspond to formula (2), providing the total content of units of formula (1) is not lower than 50% of the total mixture.

The polycarbonates suitable for use in accordance with the invention are described in German Offenlegungsschrifts Nos. 2,063,050; 1,570,703; 2,211,956; 2,211,957 and 2,248,817.

Preferred polycarbonates are polycarbonates which comprise at least 75% of structural units of formula (1). Particularly preferred polycarbonates are those which consist only of structural units of formula (1).

The polycarbonate units of formula (1) may be based for example on the following bisphenols:
bis-(3,5-dimethyl-4-hydroxyphenyl)-methane;
1,1-bis-(3,5-dimethyl-4-hydroxyphenyl)-ethane;
1,1-bis-(3,5-dimethyl-4-hydroxyphenyl)-propane;
2,2-bis-(3,5-dimethyl-4-hydroxyphenyl)-propane;
2,2-bis-(3,5-dimethyl-4-hydroxyphenyl)-butane;
2,4-bis-(3,5-dimethyl-4-hydroxyphenyl)-butane;
2,4-bis-(3,5-dimethyl-4-hydroxyphenyl)-2-methyl butane; and
3,3-bis-(3,5-dimethyl-4-hydroxyphenyl)-pentane.

Of these bisphenols, 2,2-bis-(3,5-dimethyl-4-hydroxyphenyl)-propane is particularly preferred.

Examples of bisphenols which do not correspond to formula (2), but which may be used for the production of the copolycarbonates or rather for the production of polycarbonates from bisphenols which do not correspond to formula (2), are hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones, $\alpha,\alpha'$-bis-(hydroxyphenyl)-diisopropyl benzenes and derivatives thereof which are alkylated and/or halogenated in the nucleus.

These and other suitable aromatic dihydroxy compounds are described in U.S. Pat. Nos. 3,028,365; 2,999,835; 3,148,172; 3,271,368; 2,991,273; 3,271,367; 3,780,078; 3,014,891 and 2,999,846 and in German Offenlegungsschrift No. 1,570,703.

The following aromatic dihydroxy compounds are preferred:
bis-(4-hydroxyphenyl)-sulphide;
2,2-bis-(4-hydroxyphenyl)-propane;
1,1-bis-(4-hydroxyphenyl)-cyclohexane;
2,2-bis-(3-methyl-4-hydroxyphenyl)-propane;
2,2-bis-(3,5-dichloro-4-hydroxyphenyl)-propane;
2,2-bis-(3,5-dibromo-4-hydroxy-phenyl)-propane; and
$\alpha,\alpha'$-bis-(4-hydroxyphenyl)-p-diisopropylbenzene.

2,2-Bis-(4-hydroxyphenyl)-propane is particularly preferred.

The polycarbonates may be branched by the incorporation of small quantities of polyhydroxy compounds, for example from 0.05 to 2.0 mole % (based on the bisphenols used). Polycarbonates of this type are described, for example, in German Offenlegungsschrifts Nos. 1,570,533; 2,116,974; 2,113,347; in British Patent Nos. 885,442; 1,079,821 and in U.S. Pat. No. 3,544,514. Some of the polyhydroxy compounds which may be used are, for example, phloroglucinol, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-(4,4'-dihydroxydiphenyl)-cyclohexyl]-propane, 2,4-bis-(4-hyroxyphenyl 4-isopropyl)-phenol, 2,6-bis-(2'-hydroxy-5-methylbenzyl)-4-methylphenol, 2,4-dihydroxybenzoic acid, 2-(4-hydroxyphenyl)-2-(2,4-dihydroxyphenyl)-propane, 1,4-bis-(4',4''-dihydroxytriphenylmethyl)-benzene.

The polycarbonates generally have molecular weights in the range of from 10,000 to 200,000, preferably from 15,000 to 100,000 and, with particular preference, from 20,000 to 60,000 (as measured by light scattering).

The reaction of the polymer anions with the polycarbonate takes place very quickly when a solution of the polycarbonate in an inert solvent is added to the solution of the living polymer. The reverse procedure may also be adopted. In this connection, it is preferred to use the same solvents which are required for production of the polymer anions. However, it is also possible to use other solvents providing their reactivity with the polymer anions is so low that it can be disregarded in comparison to their reactivity with the polycarbonate. Examples of such solvents are halogenated hydrocarbons with very low reactivity. The reaction times are preferably between 0.5 and 360 minutes. Particularly preferred reaction times are between 10 and 120 minutes and, more especially, between 30 and 60 minutes. The reaction time is dependent upon the particular viscosity of the solution and the mixing process can influence the properties of the product.

The temperature at which the reaction with the polycarbonate is carried out may be selected from a wide range. At low temperatures, the reaction is limited by the increasing viscosity of the solution and, at high temperatures, by the vapour pressure of the solvent. The reaction is preferably carried out at temperatures of from 20° C. to 80° C., the polymerisation temperature at which the block polymer was produced being particularly preferred for practical reasons.

The quantity of polycarbonate to be added is dependent upon the required properties of the end product. The molar ratio between block polymer anion and polycarbonate is preferably between 0.2 and 250:1, which ratio determines the properties of the products. For ratios above 250, the above-mentioned thermal stability is as low as in the case of normal A/B polymers, ie. A/B-polymer produced with conventional couplers. If the ratio is reduced from, for example, 230 through 110 to 7, there is an increasing improvement in thermal stability, for example as reflected in the Shore hardness at 100° C. The mechanical properties of the products are also improved. The range from 20 to 0.5:1 is preferred, molar ratios of A/B-anion to polycarbonate of from 15 to 1:1 being particularly preferred.

The segment polymers may be isolated by known methods, for example by a stripping process in which steam and polymer solution are simultaneously introduced into hot water. The polymer accumulates in the form of crumbs which, after the water has been separated off, may be worked up by known methods, for example by drying in vacuo at an elevated temperature or on belt dryers or in drying screws. The polymer may also be directly freed from the solvent in evaporation screws.

The polymers may be modified by hydrogenating the double bonds present in the diene blocks and the phenyl radicals.

The segment polymers obtained in accordance with the present invention may also be modified by the addition of known polymers. For example, polystyrene, rubber-modified poly-styrene or ethylene-vinylacetate copolymers may be added. In addition, the segment polymers may be mixed with fillers, such as silicic acid sure to the second autoclave over a period of 2 minutes. The temperature was allowed to rise from 25°–30° to at most 60°–65° C. and the mixture was left to react for 3 hours. The conversion amounted to 100%, based on the sum total of the monomers. 66.6 g of tetramethyl bisphenol-A-polycarbonate (MPC in short), in the form of a 20% solution in toluenne, were then added to the living polymer. The MPC had a viscosity $\eta_{rel}$ of 1.30, as measured in methylene chloride, 0.5 g of polymer in 100 ml of solvent. This value corresponded to an average degree of polymerisation of approximately 60. This solution had been previously freed from water by blowing out with nitrogen. After stirring for 1 hour at 25° to 30° C., the solvent was removed by stripping with steam following the addition of phenolic stabilisers. The moist product was dried at 80° C. in a vacuum drying cabinet. A moulded panel was produced at 180° C. from the crumbs obtained. The physical properties measured on this panel are shown in the following Table.

Table 1

| Example | $F^{(1)}$ (MPa) | D (%) | M 300/500% | H 20° | 70° | 100° | 120° | 150° | E % 25/70 | Str. (N) | F(80°) (MPa) | D(80°) (%) |
|---|---|---|---|---|---|---|---|---|---|---|---|---|
| 1 | 14.4 | 765 | 3.4/7.3 | 62 | 56 | 48 | 38 | 20 | 63/54 | 115 | 3.1 | 475 |
| 2 (Comparison) | 12.4 | 1010 | 1.9/2.9 | 61 | 50 | 23 | 12 | — | 64/56 | 80 | 0.9 | 565 |
| 3 (Comparison) | 10.1 | 860 | 3.0/6.0 | 61 | 50 | 30 | 15 | — | 57/49 | 154 | 1.4 | 470 |
| 4 | 14.1 | 600 | 7.2/11.2 | 74 | 66 | 58 | 37 | 19 | 56/53 | 135 | 4.1 | 310 |

(1)Abbreviations: F = strength, D = elongation, M = modulus, H = Shore hardness A, E = resilience, Str. = tear propagation resistance according to Pohle, F(80°) and D(80°) = F and D measured at 80° C.; the values were measured on Standard Ring I in accordance with DIN 53403.

of different origin, silicates and other minerals, sawdust, carbon black or glass fibres, with dyes, pigments, heat, oxidation, UV and other stabilisers, plasticisers, lubricants, mould release aids, flameproofing additives, for example, halogenated organic compounds, metal oxides, metal salts and organic phosphates.

The mixtures may be made softer by the addition of oils. Aliphatic, naphthenic or aromatic oils may be used. The use of polyolefin oils and polydiolefin oils is also possible. Relatively high boiling aliphatic, araliphatic and aromatic esters may also be used.

The mixtures may be stabilised with convention rubber stabilisers, for example alkylated mononuclear or polynuclear phenols or thioethers of alkylated phenols. The addition of synergistically acting compounds, for example of the thio-bis-alkane acid ester and alkyl phenyl phosphite type, is also possible.

The polymers are used for the production of commercial rubber articles, for example shoe soles, hoses, seals, films and conveyor belts.

EXAMPLE 1

This Example demonstrates the reaction of a styrene/butadiene polyanion branched with divinyl benzene with tetramethyl-bis-phenol-A-polycarbonate.

300 ml of toluene and 100 ml of destabilised styrene were introduced under nitrogen into a 2 liter capacity glass autoclave. The mixture had a water content of less than 1 ppm. The mixture was then activated by the addition of 3.03 ml of n-butyl lithium (2 molar) at 25° to 30° C. The temperature was allowed to rise to 40° C., followed by stirring for 1 hour. 750 ml of toluene, 5.9 ml of technical divinyl benzene containing 60% of DVB, distilled in vacuo, 390 ml of butadiene and 0.3 ml of n-butyl lithium were introduced into a second autoclave. After the butyl lithium had been added, the contents of the first autoclave were transferred under pres-

EXAMPLES 2 and 3 (Comparisons)

A styrene/butadiene polymer was produced in the same way as described in Example 1. On completion of polymerisation, it was stopped with methanol without any addition of MPC and then worked up (Example 2). In a parallel test, 20 phr of polystyrene 165 H (a product of BASF AG) were additionally added to the stopped solution of Example 2 which was then worked up in the same way. Comparison of the physical properties showed the superiority of the products produced in accordance with the present invention. Both the strengths and moduli and also thermal stability were improved. The products according to the invention showed a 2 to 3 fold improvement in tensile strength, as measured at 80° C. Accordingly, the products showed considerably higher Shore A hardnesses at 100° to 120° C. by comparison with the known polymers (Table 1).

EXAMPLE 4

This Example describes a variant of Example 1 which the dissipation of heat can be controlled, even on a relatively large scale.

In a 2 liter capacity glass autoclave, 91 g of styrene dissolved in 400 ml of dry toluene were polymerised under nitrogen with 3.03 ml of n-butyl lithium (2 molar) (conversion after 1 hour: 100%). The autoclave was then heated to 50° C. and a mixture of 242 g of butadiene, 1.18 g of commercial divinyl benzene with 750 ml of toluene was introduced under pressure in portions over a period of 2 hours, during which the temperature was kept constant, followed by after-reaction for 1 hour. A 20% solution of MPC ($\eta_{rel}$=1.30) in toluene containing 66.7 g of MPC, which had been dried in accordance with Example 1, was added to the solution of the living styrene/butadiene polymer, and the resulting mixture reacted for 1 hour at 40° to 50° C. The product was then isolated and worked up in the same way as described in Example 1. The mechanical properties are set out in Table 1.

EXAMPLE 5

0.6 ml of tetrahydrofuran and 2.4 ml of technical divinyl benzene (DVB content 32%) were added under nitrogen to 80 ml of dry toluene. n-Butyl lithium (0.4 mMole) dissolved in hexene were then added at 0° C., after which the temperature was gradually increased to 50° C. After 2 hours, 315 g of butadiene were initially introduced followed, after their polymerisation, by the addition of 185 g of styrene. After a total polymerisation time of 3 hours, a solution of 75 g of MPC ($\eta_{rel}=1.30$) in 375 g of toluene were added to the still living polymer. After stirring for 1 hour at 50° C., the product was worked up in the usual way and test specimens were prepared from the rubber crumbs. The results of the mechanical tests were as follows:

| F | D | M (300/500%) | H 23/70 / 100 / 120 / 150° |
|---|---|---|---|
| 14.6 | 700 | 6.8/12.1 | 76 / 72 / 63 / 39 / 12 |

EXAMPLE 6

A polymer was prepared in the same way as in Example 5 except that, instead of 315 g of butadiene, it contained the same quantity of isoprene. Testing of the material produced the following results:

| F | D | M (300/500) | H 20 / 70 / 100 / 120 / 150° |
|---|---|---|---|
| 12.3 | 1100 | 4.9/8.7 | 60 / 54 / 46 / 32 / 12 |

We claim:

1. A process for the preparation of a thermoplastic elastomer wherein 0.2–250 moles of an anion of a branched aromatic vinyl/diene block polymer having a vinyl block molecular weight of 5,000 to 500,000 and a diene block molecular weight of 10,000 to 1,000,000 is reacted per mole of an aromatic polycarbonate of molecule weight 10,000 to 200,000 or with a mixture of aromatic polycarbonates wherein at least 50% of the linear chains of the polycarbonate or mixture of polycarbonates consist of structural units corresponding to the Formula (1) having molecular weight 10,000 to 200,000

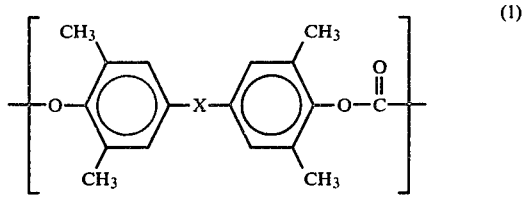

in which X represents a $C_1$–$C_5$-alkylene or $C_1$–$C_5$-alkylindene radical.

2. A process, as claimed in claim 1, wherein the polycarbonate comprises at least 75% of structural units corresponding to the Formula (1).

3. A process, as claimed in claim 1, wherein the polycarbonate is derived from 2,2-bis-(3,5dimethyl-4-hydroxyphenyl)-propane.

4. A process, as claimed in claim 1, wherein the reaction time is from 0.5 to 360 minutes.

5. A process, as claimed in claim 1, wherein the reaction is carried out at a temperature of from 20° C. to 80° C.

6. A thermoplastic elastomer producible by a process, as claimed in claim 1.

7. A process, as claimed in claim 1, wherein the molar ratio of said anion to said polycarbonate is from 1:1 to 15:1.